(12) United States Patent
Schuessler et al.

(10) Patent No.: US 6,517,805 B1
(45) Date of Patent: Feb. 11, 2003

(54) METHOD AND APPARATUS FOR PRODUCING HYDROGEN

(75) Inventors: Martin Schuessler, Ulm (DE); Tomas Stefanovski, Boeblingen (DE); Detlef zur Megede, Kirchheim/Teck (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 0 days.

(21) Appl. No.: 09/165,795

(22) Filed: Oct. 2, 1998

(30) Foreign Application Priority Data

Oct. 2, 1997 (DE) .......................... 197 43 673

(51) Int. Cl.$^7$ .............................. C01B 3/02; C01B 3/26; C01B 31/20

(52) U.S. Cl. .................... 423/648.1; 422/211; 422/212; 423/247; 423/437.2; 423/652; 423/659; 431/7; 502/527.19

(58) Field of Search ............... 502/527.18, 527.19; 423/648.1, 651, 652, 247, 437.2, 659; 252/373; 422/211, 212; 431/7

(56) References Cited

U.S. PATENT DOCUMENTS

| | | | | |
|---|---|---|---|---|
| 3,228,892 A | * | 1/1966 | Cole et al. ............. | 502/527.19 |
| 3,334,962 A | * | 8/1967 | Clearfield ................... | 502/349 |
| 3,397,154 A | * | 8/1968 | Talsma ................ | 502/527.19 |
| 4,089,941 A | * | 5/1978 | Villemin ................ | 502/527.19 |
| 4,118,199 A | * | 10/1978 | Völker et al. ........... | 502/527.19 |
| 4,337,178 A | * | 6/1982 | Atwood et al. ........ | 502/527.19 |
| 4,460,704 A | * | 7/1984 | Twigg .................... | 502/527.19 |
| 4,711,930 A | * | 12/1987 | Hoelderich et al. .... | 502/527.19 |
| 4,771,026 A | | 9/1988 | Kainer et al. | |
| 5,281,462 A | * | 1/1994 | Day et al. .............. | 502/527.19 |
| 6,036,927 A | * | 3/2000 | Chatterjee et al. .......... | 422/211 |

FOREIGN PATENT DOCUMENTS

| | | | |
|---|---|---|---|
| DE | 36 24 934 A1 | 1/1988 | |
| DE | 39 28 790 A1 | 3/1991 | |
| DE | 195 34 433 | 10/1996 | |
| EP | 0 217 532 B1 | 8/1986 | |
| EP | 0 228 885 A2 | 12/1986 | |
| EP | 0 303 438 | 2/1989 | |
| EP | 0 650 923 A1 | 5/1995 | |
| EP | 0 687 648 A1 | 5/1995 | |
| GB | 2 188 559 A | 10/1987 | |
| JP | 58026004 | 2/1983 | |
| JP | 59 122807 | 7/1984 | |
| JP | 62-30554 | 2/1987 | |
| JP | 268834 | * 11/1990 | ............ 502/527.19 |
| JP | 42 07 905 A1 | 4/1993 | |
| JP | 6-154588 | 6/1994 | |
| JP | 06172029 | 6/1994 | |

OTHER PUBLICATIONS

Chemical Abstracts, vol. 120, 1994, p. 144. (No month).
Chemical Abstracts, vol. 101, 1984, p. 404. (No month).

* cited by examiner

Primary Examiner—Wayne A. Langel
(74) Attorney, Agent, or Firm—Crowell & Moring LLP

(57) ABSTRACT

An apparatus for producing hydrogen from hydrocarbons or alcohol, particularly methanol, by feeding a reaction mixture comprising a hydrocarbon or alcohol and water onto a catalyst. The catalyst is formed by compressing at least one catalyst powder into a compressed layer to form a shaped body. The reaction mixture flows under pressure through the catalyst layer while the pressure drops. Furthermore, the apparatus is suitable for a use in a hydrogen shift phases for reducing carbon monoxide, in carbon monoxide oxidizers and catalytic burners. A process for producing the catalyst is also disclosed.

36 Claims, 2 Drawing Sheets

METHOD AND APPARATUS FOR PRODUCING HYDROGEN

BACKGROUND AND SUMMARY OF THE INVENTION

This application claims the priority of 197 43 673.0, filed Oct. 2, 1997, the disclosure of which is expressly incorporated by reference herein.

The present invention relates to an arrangement for producing hydrogen from hydrocarbons, particularly methanol, by feeding a reaction mixture comprising a hydrocarbon and water to a catalyst, as well as to a process for producing a catalyst which is suitable particularly for using such an arrangement. Furthermore, the present invention relates to an arrangement for reducing carbon monoxide, an arrangement for the oxidation of carbon monoxide and a device for catalytic burning.

The production of hydrogen from methanol is based on the total reaction $CH_3OH + H_2O \longrightarrow CO_2 + 3H_2$. In practice, a two-step or multi-step reaction sequence may be used for carrying out this reaction. A reaction mixture comprising alcohol and water vapor is guided along a suitable catalyst with the addition of heat in order to produce the desired hydrogen. A two-step reaction sequence for methanol reforming is disclosed in European Patent Document EP 0 687 648 A1. In this arrangement, the reaction mixture is fed to a first reactor in which only a partial conversion of the methanol is achieved. After flowing through the first reactor, the gas mixture, which still contains parts of non-converted educts, is guided to a second reactor which has a residual conversion optimized construction. The reactors are constructed as plate or bulk reactors in which the catalyst is provided in the form of a bulk material or a coating on the distributing ducts. Other catalysts are also known, such as coated metal sheets, nets and foams through which the reaction mixture flows.

European Patent Document EP 0 217 532 B1 describes a process for the catalytic production of hydrogen from mixtures of methanol and oxygen using a gas-permeable catalyst system. A hydrogen generator with an upper reaction zone and a lower reaction zone is provided. A reaction mixture of methanol and oxygen is fed into the upper reaction zone. After flowing through the upper reaction zone, the reaction mixture is guided into the lower reaction zone in where a spontaneous initiation of oxidation of the methanol occurs. The resulting rise in temperature partially oxidizes the methanol. Due to the presence of a copper catalyst in the upper reaction zone, hydrogen is formed.

It is an object of the present invention to provide an arrangement of the above-mentioned type wherein the construction is as simple and compact as possible. The quantity of catalyst material, is minimized (necessary for the conversion of a certain mass flow of reaction mixture). It is a further object of the present invention to provide a process for producing a catalytic structure capable of providing a minimized amount of catalyst material, wherein simple and compact construction can be achieved.

For achieving these and other objects of the present invention, an arrangement is disclosed wherein a catalytic structure is formed by pressing a catalyst material into at least one thin, large-surfaced layer. A reaction mixture is guided through the catalytic structure while the pressure decreases. In contrast to the known types of hydrogen reactors, water gas shift stages, oxidizers and catalytic burners, the catalytic structure of the present invention is not constructed as a mere surface structure, which is only surrounded by the flow of the reaction mixture. Rather, the catalytic structure is a highly compressed three-dimensional layer through which the reaction mixture is guided while under the influence of high pressure. This inventive arrangement more efficiently utilizes the active catalyst centers and achieves a high reaction rate at these centers.

Because of the considerable pressure drop during the passage of the reaction mixture through the catalyst layer according to the invention, the flow resistances of the feeding device and discharge device of the educts and products of the reaction do not play a large role in the reactive process. Accordingly, the feeding and discharge devices may have a simple design.

As a result of high compression of the catalyst material during formation, a very compact catalyst layer is achieved. The proportion of the gas space and not catalytically active solid bodies (such as carrier plates and the like) of the total volume and weight of the reactor can be significantly reduced in comparison to known arrangements. Fine-grain catalyst pellets or powder are preferably used as the catalyst material. This ensures good substance and heat transfer to and from the interior areas of the catalyst grains at high reaction rates. In addition, the proportion of pores through which the flow can take place increases as the grain size decreases; that is, the number of "dead ends" for the gas flow decreases. During flow through the layer, a high swirl of the gases will occur, reducing film diffusion resistances around the grains of the catalyst material, and improving heat transfer by convection.

In one embodiment of the invention, the catalyst layer is arranged essentially perpendicularly to the reaction mixture flow direction. This results in particularly short gas flow paths. Because of the large-surface area and highly compressed development of the catalyst layer according to the invention, when vertical flow takes place, a short path is sufficient for achieving a high reaction conversion while maintaining a high pressure drop.

In a preferred embodiment of the invention, the catalyst material is pressed together with a carrier structure, whereby the catalyst material is mechanically stabilized and/or an improved heat conduction is present. The carrier structure is preferably a three-dimensional net-type or matrix structure which may be a metallic carrier structure. Copper, particularly dendritic copper, for example, may be used as the metal.

In one embodiment of the invention, the catalyst material contains a precious metal, preferably platinum. The added precious metal reacts at relatively low operating temperatures and is therefore used for heating the catalyst arrangement. This embodiment considerably improves the cold start action of the catalyst arrangement, which is particularly advantageous when used in mobile hydrogen production.

In another embodiment of the present invention, several layers of catalytic structure are provided and are connected in parallel. As a result, the total surface through which the reaction mixture flows can be divided into several layers stacked on one another but connected in parallel. This "module construction" leads to a particularly compact construction of the hydrogen reactor.

For simplified feeding and discharging of the substances involved in the reaction, in another embodiment of the invention, guide ducts are provided in the catalyst layer for guiding educts of the reaction mixture and the reaction products.

According to another aspect of the invention, oxygen, which may be required by the reaction or to promote the reaction, remains separated from the reaction mixture until both the oxygen and the reaction mixture enter the surface plane of the catalyst layer.

A further object of the invention is a process for producing a catalytic structure, which, in particular, can be used in the previously described apparatus. According to this aspect of the invention the catalytic structure is formed by compressing at least one catalyst powder, to form a highly compressed layer into a shaped body.

In a further embodiment of this aspect of the invention, a metal powder (such as copper or dendritic copper) is admixed to the at least one catalyst powder.

In a further embodiment of the invention, the shaped body is subjected to a sintering step which follows the compression step. Sintering the body results in particularly good stability of the catalyst.

In a further development of the invention, during the compression step, guide ducts are provided in the shaped body for guiding educts and products of the catalytic reaction. Advantageously, these ducts are produced by inserting spacer elements which can be removed in a subsequent processing step. The step of removing the spacer elements can be achieved by burning, pyrolizing, dissolving or evaporating the element.

In a further embodiment of the invention, another powder layer is compressed on a previously sintered shaped body. This structure is then subjected to a further sintering step. As a result, in a multi-step process a sandwich-type catalytic structure can be produced which has several layers disposed above one another, each layer being connected in parallel by suitable guiding ducts. Thus, the whole catalytic volume through which the reaction mixture is to flow can be distributed into a smaller cross-sectional surface while maintaining a high pressure drop along a small flow path.

Other objects, advantages and novel features of the present invention will become apparent from the following detailed description of the invention when considered in conjunction with the accompanying drawings.

DETAILED DESCRIPTION OF THE DRAWINGS

Figure 1:
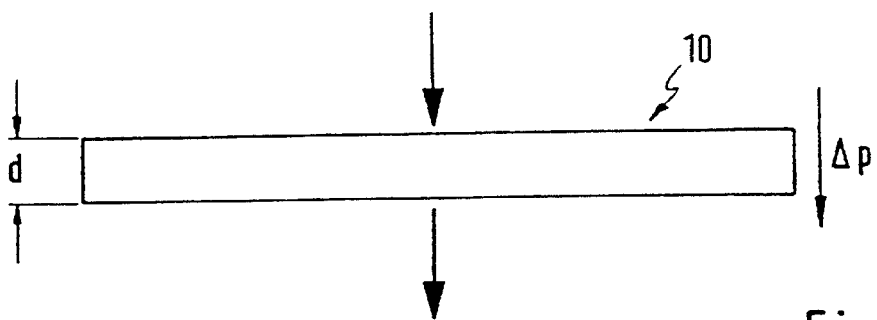
FIG. 1 is a schematic view of the method of operation of a catalyst layer according to the invention.

FIG. 1 is a schematic lateral view of a catalyst layer 10 according to the present invention. Catalyst layer 10 is formed by compressing catalyst material into a thin, large-surface, highly compressed layer. The layer 10 forms a shaped body of a thickness d which may, for example, be about 1 mm. Preferably, fine-grained catalyst powder or fine-grained catalyst pellets having grains with a diameter of approximately 0.5 mm or less are used. The compression preferably occurs at temperature of, for example, approximately 200° C. to 500° C.

The illustrated catalyst layer 10 is a component of an apparatus for producing hydrogen which is not shown in detail. The educts of the reaction mixture are guided under pressure essentially perpendicularly to the upper surface catalyst layer 10 and are pressed through layer 10. During flow through the catalyst layer 10, the reaction mixture experiences a pressure drop $\Delta p$. Preferably, $\Delta p$ is approximately 100 mbar or more (for example, 1 to 4 bar). On the opposite side of the catalyst layer 10, the catalytic reaction products emerge in the direction of the indicated arrow.

In order to provide a catalyst material with improved mechanical stability and/or heat conduction, the catalyst material is pressed into a carrier structure. This carrier structure is advantageously a net-type matrix which is obtained by mixing at least one catalyst powder with a metal powder and compressing this mixture. During the compression, the metal powder, preferably copper or dendritic copper forms a net-type matrix structure into which the catalyst grains are incorporated. Particularly suitable starting materials for the metallic matrix are dendritic copper powders which, even in the case of a relatively low mass proportion of the copper powder with respect to the overall mass of the layer, can easily be compressed or sintered together to form a net, having a large catalytically active surface. Dendritic copper powders provide a more stabilized, fixing and heat-distributing net in the micrometer range. However, non-metallic materials, such a carbon, also be used as the carrier structure.

Figure 2:
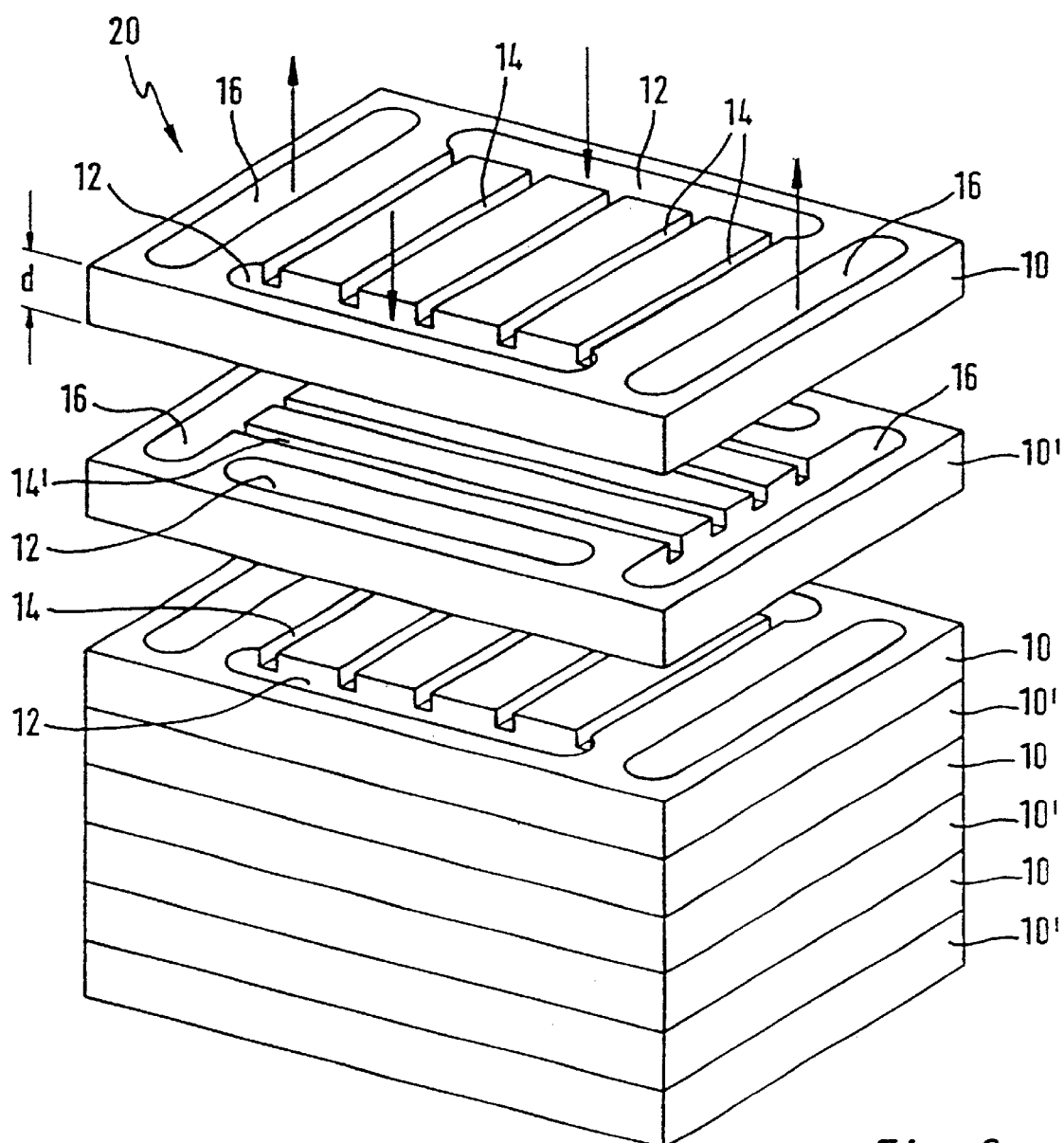
FIG. 2 is a perspective view of a stack-type arrangement of catalyst layers connected in parallel according to the invention.

The catalyst layer 10 has a relatively large surface area, preferably around 100 $cm^2$. In order to achieve a more compact construction, the catalyst volume through which the reaction mixture flows can be distributed into several layers. The layers are arranged on top of one another and are connected in parallel. Such an arrangement is illustrated in FIG. 2 which shows a stack 20 comprising a plurality of stacked catalyst layers 10, 10' situated on top of one another. The layers are shown as spaced apart from one another to better illustrate the method of operation.

The catalyst layers 10 and 10' have guide ducts 12, 14, 14', 16 for guiding educts and products of the catalytic reaction. In the embodiment illustrated in FIG. 2, educt guide ducts 12 are provided in the catalyst layers 10 and 10' and extend essentially parallel to the longitudinal edges of layers 10 and 10', forming guide ducts perpendicularly through the surface plane of the catalyst layer. In this embodiment educt guide ducts 12 of catalyst layers 10, 10' are situated above one another and are arranged to be essentially mutually congruent, thus forming a guide duct for the educts of the reaction mixture which continues through the entire stack 20.

Depending on what the stack arrangement is being used for a specific reaction mixture is guided through the educt guide ducts 12. If the reaction structure is used as a hydrogen reactor, the reaction mixture comprises alcohol, particularly methanol, as well as chemically bound hydrogen, preferably in the form of water. When the stack 20 is used for a so-called $H_2$-shift reaction for reducing carbon monoxide while releasing carbon dioxide, the reaction mixture comprises carbon monoxide and hydrogen. When stack 20 is used as a carbon monoxide oxidizer, the reaction mixture comprises a CO-containing gas as well as an $O_2$-containing gas. When the catalyst stack 20 is used as a catalytic burner, the reaction mixture comprises a burnable educt, such as an $O_2$-containing gas.

The educt guide ducts 12 of each catalyst layer 10 are connected by distribution ducts 14 which extend essentially parallel to the surface dimension of the catalyst layer 10. Distribution ducts 14 divert at least a portion of the reaction mixture entering through the educt guide ducts 12 into the interior of the catalyst layer 10.

Therefore, according to the invention, at least a portion of the reaction mixture in each layer 10 plane entering through the educt guide ducts 12, as it is guided through the stack 20, is diverted through the distribution ducts 14 into the interior of two adjoining catalyst layers 10, 10', achieving a parallel connection of the stacked catalyst layers.

As described above, in the embodiment illustrated in FIG. 2, two spatially separated educt guide ducts 12 are provided per catalyst layer 10, 10'. Guide ducts 12 can be used for guiding different substances of the reaction mixture separately from one another so that individual constituents of the reaction mixture do not come into contact before they are in the plane of the catalyst layer 10.

Figure 3:
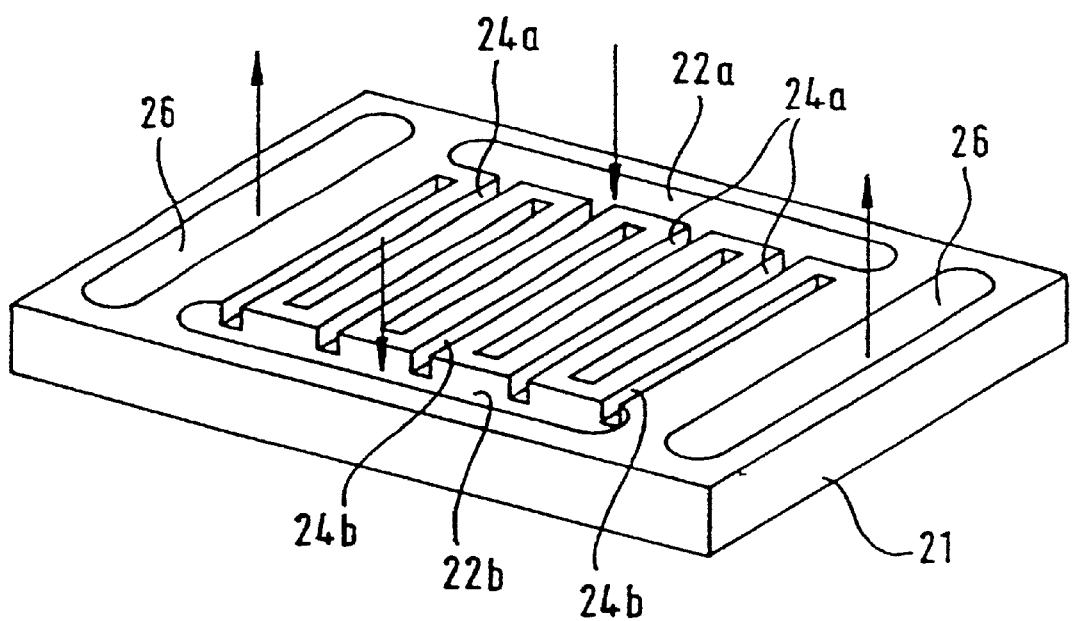
FIG. 3 is a perspective view of another embodiment of a single catalyst layer according to the invention.

Another embodiment of a catalyst layer with a guide duct structure is illustrated in FIG. 3. The catalyst layer 21 illustrated in FIG. 3 has educt guide ducts 22a, 22b and product ducts 26. Guide ducts 22a, 22b and 26 basically correspond to the educt ducts and product ducts 12 and 16 respectively, as described in conjunction with FIG. 2. The two educt ducts 22a, 22b, which are spatially separated from one another, are not connected with one another by a distribution duct as shown in FIG. 2. Rather, distribution ducts 24a and 24b extend transversely from each of the educt ducts 22a, 22b respectively, across the catalyst layer 21 but end before reaching the opposite educt duct 22b or 22a. As a result, an arrangement of alternating mutually engaging ducts is provided which can be used for separately feeding different gases required for the reaction or to promote it. For example, in a methanol reformer, a mixture of methanol and water vapor is fed through one educt duct, for example, duct 22a, and oxygen or air can be fed through the corresponding other duct 22b. By way of the distribution ducts 24a, 24b for the respective educt duct, the substances are distributed in the catalyst layer 21 and do not come in mutual contact before they are in the layer itself. As a result, a particularly homogeneous and safe (explosion danger) distribution and mixing of the educts is achieved, avoiding any danger of explosion. Naturally, embodiments are also conceivable which differ from the illustrated embodiments and have only one educt duct or more than two educt ducts.

Product ducts 16 are constructed analogously to the educt ducts 12, and are arranged along the transverse edges of the catalyst layers 10, 10'. Product ducts 16 form guide ducts which also extend essentially perpendicularly to the surface dimension of each catalyst layer 10. When the catalyst layers are stacked, each product duct 16 is situated in a congruent manner with the product ducts of the catalyst layer 10, 10' situated above or below. The product ducts 16 of each catalyst layer 10' are connected with collecting ducts 14', collecting ducts 14' collect he reaction product emerging from the respective catalyst layer 10, 10' situated above and below each collecting duct. The reaction product is fed transversely to the product ducts 16, whereby the reaction products are discharged through the stack 20.

Thus, in the illustrated embodiment of an apparatus for producing hydrogen according to the invention, the superimposed catalyst layers 10, 10' have respectively alternating methods of operation. In the catalyst layers 10 the educts fed through the educt ducts 12 are distributed and, by way of distribution ducts 14, are distributed over the surface of the catalyst layer situated above and below the distribution ducts. The reaction educts flow through this catalyst layer 10 essentially vertically and under a considerable pressure drop. In the respective following catalyst layer 10', the products of the catalytic reaction are collected in collecting ducts 14' and are fed to the product ducts 16 for discharging from the catalyst stack 20.

Naturally, the invention is not limited to the illustrated and described embodiment. Other embodiments are conceivable in which each catalyst layer can accomplish the feeding, distributing, collecting and discharging of the educts and products. More complex catalyst layers can be produced, for example, by compressing and sintering catalyst material in powder form onto previously sintered catalyst layers.

According to the invention, catalyst layers are provided which can be produced in a simple and compact manner and are suitable for use in many different applications; for example, as hydrogen reactors for the catalytic production of hydrogen; in hydrogen shift stages, for the reduction of CO, in carbon monoxide oxidizers as well as in catalytic burners. By means of the further development of the catalyst layers according to the invention, a modular construction is permitted. Modular construction produces low thermal losses and no large temperature gradients, providing a reaction which takes place homogeneously over a large volume. The whole catalyst volume can be reached by means of educts which results in significantly improved starting dynamics. Furthermore, the danger of the ignition of the homogeneous burning of methanol or of a detonating gas reaction is avoided.

By appropriately selecting the process parameters such as compression power, temperature, type and condition of the starling materials, such as distribution of grain sizes, porosity, etc., a person skilled in the art can produce a catalyst layer or catalyst layer arrangements according to the invention which is tailored to the respective requirements and optimized with respect to the layer sequence, heat distribution, flow conditions and mechanical characteristics, such as pressure drop and stability.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for producing hydrogen by feeding a reaction mixture comprising a fuel containing a chemically bound hydrogen and water to a catalyst, wherein:
   the catalyst comprises at least one porous layer formed by a catalyst material comprising catalyst particles, said particles being compressed to such an extent as to substantially eliminate free fluid flow passages through said layer; and
   said layer has a thickness and is so adapted such that the reaction mixture can flow through the porous catalyst particles of said layer under pressure, with a pressure drop.

2. An apparatus according to claim 1, wherein the catalyst material is compressed with a carrier structure.

3. An apparatus according to claim 2, wherein the carrier structure is a net-type metallic carrier structure.

4. An apparatus according to claim 3, wherein the net-type carrier structure comprises copper.

5. An apparatus according to claim 4, wherein the net-type carrier structure comprises dendritic copper.

6. An apparatus according to claim 1, further comprising means for feeding a gas comprising oxygen to promote reaction, separately from the reaction material.

7. An apparatus according to claim 6, further comprising means for maintaining the oxygen and the other reaction material remain separate until the layer is reached.

8. An apparatus according to claim 1, further comprising means for guiding a flow of the reaction mixture through said at least one layer in a direction that is substantially perpendicular to said layer.

9. An apparatus according to claim 1, wherein the catalyst material comprises platinum.

10. An apparatus according to claim 1, wherein said catalyst comprises a plurality of layers which are connected in parallel.

11. An apparatus according to claim 1, wherein at least one duct guide is provided in the at least one layer, for guiding educts of the reaction mixture and reaction products.

12. An apparatus for producing hydrogen according to claim 1, wherein said fuel is methanol.

13. The apparatus according to claim 1 wherein said particles have a diameter which is less than approximately 0.5 mm.

14. An apparatus for reducing carbon monoxide by feeding a reaction mixture comprising carbon monoxide and hydrogen to a catalyst, wherein:

the catalyst comprises at least one porous layer formed by a catalyst material comprising catalyst particles, said particles being compressed to such an extent as to substantially eliminate free fluid flow passages through said layer; and said layer has a thickness and is so adapted such that the reaction mixture can flow through the porous catalyst particles of said layer under pressure, with a pressure drop.

15. An apparatus according to claim 14, wherein the layer is arranged essentially perpendicularly to a flow of the reaction mixture.

16. An apparatus according to claim 14, wherein the catalyst material is compressed with a carrier structure.

17. An apparatus according to claim 14, wherein the catalyst material comprises platinum.

18. The apparatus according to claim 14 wherein said particles have a diameter which is less than approximately 0.5 mm.

19. An apparatus for the oxidation of carbon monoxide by feeding a reaction mixture comprising carbon monoxide and oxygen to a catalyst, wherein:

the catalyst comprises at least one porous layer formed by catalyst material comprising catalyst particles, said particles being compressed to such an extent as to substantially eliminate free fluid flow passages through said layer; and said layer has a thickness and is so adapted such that the reaction mixture can flow through the catalyst particles of said layer under pressure, with a pressure drop.

20. An apparatus according to claim 19, further comprising means for guiding a flow of the reaction mixture through said at least one layer in a direction that is substantially perpendicular to said layer.

21. An apparatus according to claim 19, wherein the catalyst material is compressed with a carrier structure.

22. An apparatus according to claim 19, wherein the catalyst material comprises platinum.

23. The apparatus according to claim 19 wherein said particles have a diameter which is less than approximately 0.5 mm.

24. An apparatus for the catalytic burning of a burnable educt by feeding a reaction mixture comprising the burnable educt and an oxygen-containing gas to a catalyst, wherein:

the catalyst comprises at least one porous layer formed by a catalyst material comprising catalyst particles, said particles being compressed to such an extent as to substantially eliminate free fluid flow passages through said layer; and said layer has a thickness and is so adapted such that the reaction mixture can flow through the porous catalyst particle.

25. An apparatus according to claim 24, further comprising means for guiding a flow of the reaction mixture through said at least one layer in a direction that is substantially perpendicular to said layer.

26. An apparatus according to claim 24, wherein the catalyst material is compressed with a carrier structure.

27. An apparatus according to claim 24, wherein the catalyst material comprises platinum.

28. The apparatus according to claim 24 wherein said particles have a diameter which is less than approximately 0.5 mm.

29. An apparatus for producing hydrogen, comprising:

a layer comprising compressed catalyst pellets for catalytically reacting a reaction mixture comprising a hydrocarbon and water to produce hydrogen, wherein said layer has a thickness and is so adapted such that the reaction mixture can flow through the compressed catalyst particles and exhibit a pressure drop.

30. A catalytic reactor for separating materials comprising at least one porous layer formed by compression of the catalytic material into a three dimensional shape having a predetermined thickness, wherein:

the catalyst material comprises catalyst particles, said particles being compressed to such an extent as to substantially eliminate free fluid flow passages through said layer; and the at least one layer has a thickness and is so adapted such as to allow the flow of a reaction mixture through the porous layer, under gradually decreasing pressure.

31. An apparatus for producing hydrogen, comprising:

a catalyst comprising at least one porous layer of pressed catalytic material comprising catalyst particles, said particles being compressed to such an extent as to substantially eliminate free fluid flow passage through said layer;

means for feeding a fuel containing chemically bound hydrogen and a reaction mixture comprising water onto a surface of said catalyst;

wherein said surface of said catalyst has a thickness and is so adapted such that the reaction mixture can pass through said surface under pressure, with a corresponding drop in pressure.

32. An apparatus for producing hydrogen according to claim 31 wherein said fuel is methanol.

33. A method for producing hydrogen, comprising:

providing a catalyst comprising at least one porous layer of pressed catalytic material comprising catalyst particles, said parties being compressed to such an extent as to substantially eliminate free fluid flow passage through said layer, said catalyst having a surface which has a thickness such that a pressurized reaction mixture comprising a fuel which contains chemically bound hydrogen and water can pass through said surface, with a drop in pressure;

feeding a reaction mixture comprising a fuel which contains chemically bound hydrogen and water to said surface of said catalyst; and applying pressure to said reaction mixture, whereby it passes through said catalyst.

34. A method for producing hydrogen according to claim 33, wherein said fuel is methanol.

35. A method for producing hydrogen, comprising:

feeding a reaction mixture comprising a hydrocarbon and water, under pressure, essentially perpendicularly to an upper surface of a layer comprising compressed catalyst pellets;

pressing the reaction mixture through the layer of compressed catalyst pellets, wherein the reaction mixture experiences a pressure drop; and catalytically producing hydrogen.

36. A method for producing hydrogen, comprising:

feeding a reaction mixture comprising a hydrocarbon and water through educt guide ducts extending vertically through a plurality of layers, each layer comprising compressed catalyst pellets;

diverting a portion of the reaction mixture from the educt guide ducts through distribution ducts on one or more layers;

directing the portion of the reaction mixture, under pressure, from the distribution ducts through the one or more layers, thereby forming hydrogen;

directing the hydrogen into collecting ducts arranged on another layer and from the collecting ducts to product guide ducts at each end of the collecting ducts.

* * * * *